3,270,029
CERTAIN 3 - PHENYL - 5 - ALKYL-1,2,4-OXA-DIAZOLES, SUBSTITUTED IN THE PHENYL RING

Giuseppe Palazzo, Rome, Italy, assignor to Aziende Chimiche Riunite Angelini Francesco, Rome, Italy
No Drawing. Filed Jan. 2, 1964, Ser. No. 335,402
Claims priority, application Italy, Jan. 7, 1963, 193/63
15 Claims. (Cl. 260—307)

The present invention relates to 3-phenyl-5-alkyl-1,2,4-oxadiazoles, which are substituted in the phenyl ring and whose general formula is:

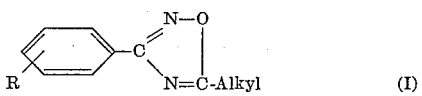

in which R (which may occupy any of the ortho, meta and para positions) is a radical that is liable to convert the compound to a water soluble salt, and precisely a radical chosen from the group: —OH, COOH, —NH$_2$, —N(CH$_3$)$_2$, —SO$_3$H, SO$_2$NH$_2$, —SO$_2$NHR', —SO$_2$NR'$_2$, —NH—NH$_2$, —NH—CN, —NH—C(NH)NH$_2$, or a nitro group or an ureido or a thio-ureido group, and alkyl is a lower alkyl radical having 1 to 4 carbon atoms.

These compounds present analgetic and antiphlogistic activities.

A method for preparing the compounds of the general Formula I involves reacting anhydrides or chlorides of carboxylic acids with benzamidoximes, which are substituted or not on the phenyl ring with R groups, and eventually said substituents are introduced in the phenyl ring after cyclization to an 1,2,4-oxadiazole.

Cyclization of a benzamidoxime, carrying radical R on the ring, with an anhydride or a chloride of an acid (the Tiemann reaction), according to the following formula, is especially appropriate in case R does not react with the acylating agent, and particularly when R is a nitrogroup.

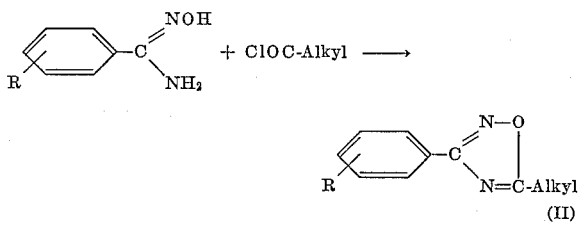

Sulphamides also may be prepared according to said reaction but the cyclization conditions must be adequately chosen in order to avoid acylation of the sulphamid group. Some nitro-derivates, as well as some sulphamides, differing from the compounds here claimed, are already described in the literature, as obtained with the same reaction (see Schopff, Berichte 18, 1066, 2473; Weise, Berichte 22, 2420; Ponzio e Busti, Gazz. Chim. Ital. 36, II, 340; Pinnow Saman, Berichte 29, 629).

Substituent R may be introduced in the 3-phenyl-5-alkyl-1,2,4-oxadiazole already formed, according to a variation of the method. The conditions of nitration, sulphonation, and chlorosulphonation of 3-phenyl-5-alkyl-1,2,4-oxadiazole have been studied, and it was observed that the substitution occurs selectively and sometimes with optimate yields, in position meta:

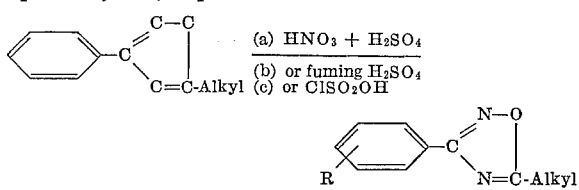

R
a=NO$_2$
b=SO$_3$H
c=SO$_2$Cl

All claimed compounds, but carboxylic acids, may be prepared with known methods from the nitroderivates obtained according to the present invention's method. (See Spilker, Berichte 22,2781; Chem. Berichte 24,833; Krone, Berichte 24,838; Paschen, Berichte 24,3675).

The reduction may be carried out with Raney nickel catalyst, according to a method not precedingly applied to these compositions, or else with NaHS; but also stannous chloride and zinc powder may be used to this end, according to classical methods.

Amines give dimethylamino-derivatives by reductive alkylation as to Eschweiler-Clarke's technique; by treatment with potassium cyanate amines give ureas; with thiocyanate the thio-ureido derivatives.

The other compounds claimed are obtained through diazonium chlorides, which give the corresponding phenols by hydrolysis. (crf. Andrews, King and Walker, Proc Roy. Soc. B 133, 20; Bergmann, Bendas e d'Avilla, J. Org. Chem. 1864), the hydrazines by reduction, the sulphonyl chlorides with sulphur dioxide treatment. Sulphonium acids are obtained from sulphonyl chlorides through hydrolysis, and sulphamides from the same when treated with amines.

Obviously, the direct sulphonation and chlorosulphonation of preformed 3-phenyl-5-alkyl-1,2,4-oxadiazoles is much more convenient.

Preparation of carboxylic acids (some of them are already known) is carried out by forming an oxadiazole ring according to the classical schema starting from the carbethoxybenzonitrile, and hydrolyzing the ester according to the schema:

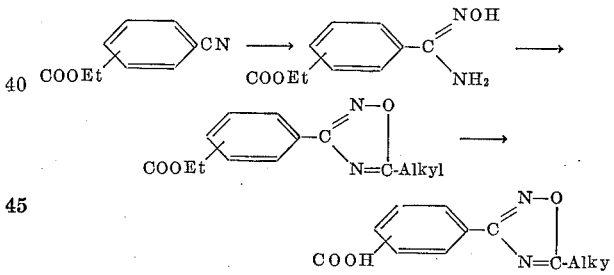

The following examples illustrate the invention's methods:

EXAMPLE 1
*3-p-nitrophenyl-5-propyl-1,2,4-oxadiazole*

80 g. of crude p-nitrobenzamidoxime and 160 cc. of butyric anhydride are heated during one hour at 150° C. The reaction product is cooled and filtered. By crystallization from hexane, 70 g. of nitroderivatives M.P. 89° C. are obtained.

*Analysis.*—For C$_{11}$H$_{11}$N$_3$O$_3$. Found: C, 56.60; H, 4.48. Calc.: C, 56.65; H, 4.75.

EXAMPLE 2
*3-p-nitrophenyl-5-butyl-1,2,4-oxadiazole*

A solution of 36.4 g. of p-nitrobenzamidoxime in 16 g. of anhydrous pyridine and 140 cc. of xylene is warmed to 60–70° C.

A solution of 30.4 valeroyl chloride in 100 cc. of xylene is added to it during about half an hour. The temperature is elevated gradually at the end; 150 cc. of solvent are distilled off and replaced with as much xylene. The solution is cooled by adding 40 cc. of water and the layers are separated.

The xylenic phase is washed accurately with dilute NaOH and dried. After removing the solvent an oil is left over which soon crystallizes and can be purified either by distilling it (B.P.$_{0.4}$ 144° C.) or else by crystallizing it from hexane. (M.P. 43–4° C.). 33 g. of nitroderivate are obtained.

Analysis.—For $C_{12}H_{13}N_3O_3$. Found: C, 58.05; H, 5.52. Calc.: C, 58.29; H, 5.30.

EXAMPLE 3

3-m-nitrophenyl-5-ethyl-1,2,4-oxadiazole

A mixture of 50 g. of benzamidoxime and 135 cc. of propionic anhydride is heated to ebullition for two hours, cooled, and taken up with ether and dilute sodium hydroxide. The etheric layer is dried. After removing the solvent, the residue is distilled.

There are obtained 50 g. of 3-phenyl-5-ethyl-1,2,4-oxadiazole (B.P. 104° C. at 2.3 mm.).

50 g. of 3-phenyl-5-ethyl-1,2,4-oxadiazole are dissolved in 160 cc. of concentrated sulphuric acid while cooling with a freezing mixture. Keeping the temperature under 0° C., 45 cc. of nitrating mixture, consisting in 3 parts by volume of concentrated $H_2SO_4$ and 2 parts by volume of concentrated $HNO_3$ are added.

Finally the mixture is poured cautiously into an iced solution of 350 g. of NaOH in 2 litres of water and taken up with ether. The organic layer is washed to neutrality and dried. By removing the solvent a solid residue is obtained, which may be crystallized from petroleum ether, 32 g. of product (M.P. 64–65° C.).

Analysis.—For $C_{10}H_9N_3O_3$. Found: C, 54.57; H, 4.12. Calc.: C, 54.79; H, 4.14.

EXAMPLE 4

3-p-aminophenyl-5-isobutyl-1,2,4-oxadiazole

A solution of 0.03 mols of 3-p-nitrophenyl-5-isobutyl-1,2,4-oxadiazole in 50 cc. dioxane is treated with 1.1 cc. Raney-nickel under 3 atm. of hydrogen.

The absorption reaches the theoric value after about eight hours. The catalyst is filtered off, and the solvent removed at reduced pressure. The residue is then treated with diluted HCl and after filtering off insoluble tarry material, is alkalized with NaOH and extracted with ether. The etheric layer is dried, the solvent removed and the product distilled.

3 - p - aminophenyl-5-isobutyl-1,2,4-oxadiazole boils at 135° C. at 0.1 mm. Yield 93%.

Analysis.—For $C_{12}H_{15}N_3O$. N Found: 19.15. Calc.: 19.34.

The benzoyl derivative melts at 139°.

EXAMPLE 5

3-p-aminophenyl-5-butyl-1,2,4-oxadiazole 39 g. of 3-p-nitrophenyl-5-butyl-1,2,4-oxadiazole are dissolved in 400 cc. of anhydrous dioxane and treated with 7 cc. Raney Nickel at 40 atm. of hydrogen in an autoclave. The absorption reaches the theoric value after a short time. The catalyst is filtered off, the solvent removed at reduced pressure and the residue is taken up with ether and diluted HCl.

The acid solution is decolored with charcoal and energetically cooled. The hydrochloride crystallizes and more material is recovered by concentrating the mother solution.

26 g. of 3-p-aminophenyl-5-butyl-1,2,4-oxadiazole hydrochloride are obtained. The product, as crystallized from acetone, melts at 181° C.

Analysis.—For $C_{12}H_{16}ClN_3O$. Cl Found: 14.14. Calc.: 13.98.

The free amine boils at 159° at 0.9 mm.

EXAMPLE 6

3-m-aminophenyl-5-ethyl-1,2,4-oxadiazole

In the first place, a hydromethanolic solution of NaHS is prepared from 50.5 g. of anhydrous sodium sulphide, 16.6 g. of sodium bicarbonate, 115 cc. of methanol and 102 cc. of water.

This solution, containing 11.8 g. of NaHS, is added to a boiling solution of 29 g. of 3-m-nitrophenyl-5-ethyl-1,2,4-oxadiazole in 1400 cc. of methanol. The mixture is boiled 20 more minutes until 200 cc. of the solvent are distilled off.

It is then cooled and extracted with ether. The etheric solution is treated with HCl 1:1, the acid solution is treated with alkali and the base is extracted with ether, and the ethereal solution is dried and distilled. 3-m-aminophenyl-5-ethyl-1,2,4-oxadiazole boils at 143° C. at 0.1 mm. Yield g. 19.5; the melting point of the hydrochloride is 175° C.

Analysis.—For $C_{10}H_{12}ClN_3O$. Cl Found: 15.70. Calc.: 15.71.

EXAMPLE 7

3-p-aminophenyl-5-propyl-1,2,4-oxadiazole

A freshly prepared hydromethanolic solution of 20,6 g. of NaHS is added slowly to a boiling solution of 3-p-nitrophenyl-5-propyl - 1,2,4 - oxadiazole in 350 cc. methanol. The mixture is then boiled during twenty minutes, until 500 cc. of solvent are distilled off and is then cooled. 300 cc. of water are added to it. A liquid product is separated, which after washing with water and drying weighs 44 g.

The crude 3-p-aminophenyl-5-propyl-1,2,4-oxadiazole is crystallized from a little benzene. 30 g. of the product melting at 88° C. are recovered.

Analysis.—For $C_{11}H_{13}N_3O$. Found: C, 64.70; H, 6.22. Calc.: C, 65.00; H, 6.45. The hydrochloride melts at 188° C.

EXAMPLE 8

3-p-dimethyl-aminophenyl-5-ethyl-1,2,4-oxadiazole 6.5 g. of 3-p-aminophenyl-5-ethyl-1,2,4-oxadiazole are dissolved in 10 g. of 98% formic acid. 10 g. of 30% formaldehyde are added and the mixture is refluxed during 16 hours.

It is then concentrated to dryness under reduced pressure. The residue is taken up with dilute HCl, freed from insoluble tarry residues by filtering, cautiously alkalized with a 50% potassium carbonate solution and finally extracted with ether.

The etheric layer is washed carefully, dried, and the solvent is removed. A solid residue is obtained which crystallizes from methanol. 3 g. of 3-p-dimethyl-aminophenyl-5-ethyl-1,2,4-oxadiazole M.P. 100° are obtained.

Analysis.—For $C_{12}H_{15}N_3O$. Found: C, 66.07; H, 6.93; N, 19.03. Calc.: C, 66.34; H, 6.96; N, 19.34. The hydrochloride melts at 193° (dec.)

EXAMPLE 9

3-p-ureido-phenyl-5-isobutyl-1,2,4-oxadiazole 9 g. of 3-p-aminophenyl-5-isobutyl-1,2,4-oxadiazole are dissolved into a slight excess of dilute HCl. A concentrated aqueous solution of 7.6 g. of potassium cyanate is then added. After one night at room temperature the mixture is extracted with ether, the extract dried, and the solvent removed. The residue, crystallized from benzene weighs 4.2 g. and melts at 160° C.

Analysis.—For $C_{13}H_{16}N_4O_2$. Found: N, 21.68. Calc.: N, 21.35.

EXAMPLE 10

3-m-guanidinophenyl-5-ethyl-1,2,4-oxadiazole

A mixture of 12 g. of 3-m-aminophenyl-5-ethyl-1,2,4-oxadiazole hydrochloride, 3 g. of cyanamide and 45 cc. of absolute alcohol are refluxed during 12 hours. The solvent is removed at reduced pressure, the residue is taken up with water, acidified with HCl to pH 4 and decolored with charcoal, filtered and alkalized with NaOH.

A solid substance precipitates, and is crystallized from alcohol. 5.1 g. of M.P. 176° substance are obtained. The analytic sample of 3-m-guanidinophenyl-5-ethyl-1,2,4-oxadiazole melts at 178–80°.

*Analysis.*—For $C_{11}H_{13}N_5O$. N Found: 30.42. Calc.: N, 30.29.

EXAMPLE 11

*3-p-thioureidophenyl-5-methyl-1,2,4-oxadiazole*

A solution of 11 g. of 3-p-aminophenyl-5-methyl-1,2,4-oxadiazole in 30 cc. of concentrated HCl and 100 cc. of water is added to a solution of 22 g. of ammonium thiocyanate in 22 cc. of water. It is refluxed during 6 hours. At first there is total dissolution but already after one hour the reaction product begins to precipitate.

The reaction mixture is cooled, filtered and the product is crystallized from dioxane. 10 g. of compound are obtained M.P. 200° C. (dec.). The analytic sample melts at 204°

*Analysis.*—For $C_{10}H_{10}N_4OS$. S Found: 13.48. Calc.: 13.69.

EXAMPLE 12

*3-p-cyanamido-phenyl-5-methyl-1,2,4-oxadiazole*

A suspension of 46.8 g. of 3-p-thioureidophenyl-5-methyl-1,2,4-oxadiazole in 300 cc. of water is warmed to B.P.

There is added a boiling solution of 112 g. of KOH in water, and immediately, under stirring, a hot solution of 88 g. of neutral lead acetate. The mixture is boiled during 5 minutes, and is cooled at 0°. The precipitate is filtered and extracted with a hot solution of dilute KOH. The liquids are mixed and cooled to 5°, the pH is made slightly acid by adding 125 cc. of acetic acid. The precipitate is filtered, washed thoroughly with water, dissolved in 250 cc. of KOH, filtered and again precipitated with acetic acid. The precipitate is then washed, dried and crystallized from 80% alcohol. 20.5 g. of 161–3° melting substance are thus obtained. An analytical sample melts at 164°.

*Analysis.*—For $C_{10}H_8N_4O$. Found: C, 59.71; H, 4.24; N, 28.23. Calc.: C, 59.99; H, 4.03; N, 27.99.

EXAMPLE 13

*3-p-hydroxyphenyl-5-ethyl-1,2,4-oxadiazole*

A solution of 4.5 g. of sodium nitrite in 30 cc. of water is slowly added to a cooled solution of 11.5 g. of 3-p-aminophenyl-5-ethyl-1,2,4-oxadiazole in 28 cc. of concentrated HCl and 100 cc. of water.

The diazonium salt, as hereinbefore prepared, is hydrolyzed by warming it together with a solution of 45 cc. of concentrated sulphuric acid in 100 cc. of water. The precipitate is filtered and the product is purified by taking it up with dilute alkali and precipitating it again by acidification. It crystallizes then from 35 cc. of acetic acid. 7 g. of 3-p-hydroxyphenyl-3-ethyl-1,2,4-oxadiazole, whose M.P. is 121°, are obtained.

*Analysis.*—For $C_{10}H_{10}N_2O_2$. Found: C, 63.05; H, 5.03. Calc.: C, 63.15; H, 5.30.

EXAMPLE 14

*3-p-hydrazinophenyl-5-propyl-1,2,4-oxadiazole*

A solution of sodium sulphite is prepared from 8.5 g. of NaOH in 65 cc. of water. A diazonium salt solution is prepared by dissolving 8 g. of 3-p-aminophenyl-5-propyl-1,2,4-oxadiazole in 8 cc. of concentrated HCl and 3.1 cc. of water. The filtered solution of the diazonium salt is added rapidly to the sulphite solution, taking care that the temperature does not rise over 5°. The mixture is then warmed during half an hour to 65° and, after adding 4 cc. of concentrated HCl to adjust the pH between 3 and 4, is kept during 4 hours at this temperature. Finally 40 cc. of concentrated HCl are added and the mixture is cooled with a freezing mixture. The precipitate is filtered, dried and crystallized from alcohol. 4.5 g. of hydrochloride are obtained, which melts at 199° (dec.)

3 - p - hydrazino - phenyl - 5 - propyl - 1,2,4-oxadiazole is obtained by alkalizing the hydrochloride; this compound, crystallized from methanol, melts at 112–113°.

*Analysis.*—For $C_{11}H_{14}N_4O$. Found: C, 60.43; H, 6.54; N, 25.48. Calc..: C, 60.53; H, 6.47; N, 25.67.

EXAMPLE 15

*4-[3'(1',2',4'-oxadiazolyl-5'-propyl)]benzene-sulphonic acid*

A solution of 40 g. of 3-p-aminophenyl-5-propyl-1,2,4-oxadiazole hydrochloride in 35 cc. of concentrated HCl and 26 cc. of water are diazotized with 1 g. $NaNO_2$ in 20 cc. of water, and the solution is filtered. The solution is then poured, during 30 minutes, in a mixture of 350 cc. of glacial acetic acid saturated with $SO_2$ with 8.2 g. of finely ground copper chloride powder, keeping the temperature about 7°. The mixture is then kept at 10° during 5 minutes and is filtered. It is washed with water, dried and crystallized from methanol. 21 g. of sulphonyl chloride are obtained, melting at 68–70°. An analytical sample has M.P. 71.5.

*Analysis.*—For $C_{11}H_{11}N_2ClO_3S$. S Found: 10.92. Calc.: 11.18.

6 g. of this substance are boiled during 50' with 12 cc. of water, decolored with charcoal, and evaporated to dryness under reduced pressure. The residue is washed with hexane and crystallized from chloroform. The acid crystallizes with two molecules of water and melts at 95–6°.

*Analysis.*—For $C_{11}H_{12}N_2O_4S$. Found: C. 43.08; H, 5.23; S, 10.44. Calc.: C, 43.41; H, 5.29; S, 10.53.

EXAMPLE 16

*3-p-ethyl-sulphonamideophenyl-5-ethyl-1,2,4 oxadiazole*

55 g. of 3-p-aminophenyl-5-ethyl-1,2,4-oxadiazole are dissolved in 89 cc. of concentrated HCl and 45 cc. of water. To this solution is added a solution of 21.5 g. of sodium nitrite in 35 cc. of water with cooling. The solution of the diazonium salt is filtered and is added in about 10 minutes to a mixture of 525 cc. of glacial acetic acid saturated with $SO_2$ and 14.4 g. of copper chloride keeping the temperature at about 5°. When the addition is complete, the mixture is kept at 10° during about one hour; then there is added one third of its volume of iced water and the precipitate is recovered. The sulphonyl chloride prepared by this method and crystallized from methane weighs 26 g. and has a M.P. of 81°.

*Analysis.*—For $C_{10}H_9ClN_2O_3S$. S Found: 11.54. Calc.: 11.74.

10 g. of the sulphonyl chloride obtained are dissolved in 200 cc. of anhydrous benzene. This solution is added to a solution of 7.2 g. of ethylamine in benzene, and the mixture is warmed to 60°. After removing the solvent, the residue is taken up with anhydrous ether and the insoluble is filtered off. The solvent is again removed and the residue is crystallized from 50% methanol, 6.7 g. of 3 - p - ethyl - sulphonamido - phenyl - 5 - ethyl - 1,2,4-oxadiazole are obtained. M.P. 105°.

*Analysis.*—For $C_{12}H_{15}N_3O_3S$. Found: C, 51.52; H, 5.07. Calc. C, 51.24; H, 5.28.

EXAMPLE 17

*3-m-sulphamoylphenyl-5-methyl-1,2,4-oxadiazole*

A solution of 3.1 g. of acetyl chloride in 35 cc. of acetone is added with stirring to a mixture, cooled with iced water, of 6.3 g. of sulphamoyl-benzamidoxime, 2.8 g. of anhydrous potassium carbonate and 150 cc. of anhydrous acetone. The mixture is then stirred during 4 more hours at room temperature. The solid precipitate is filtered and is put together with more product obtained by removing the solvent under reduced pressure, washed with water, and dried under vacuum.

The O-acetyl derivate obtained in this way may be directly cyclized. This is effected by warming to 240° at 40 mm. until water is evolved; 3-m-sulphamoylphenyl-5-methyl-1,2,4-oxadiazole is obtained and crystallized from alcohol. 4 g. of product having M.P. 154–6° are obtained.

*Analysis.*—For $C_9H_9N_3O_3S$. S Found: 13.45. Calc.: 13.40.

EXAMPLE 18

*3-m-sulphamoylphenyl-5-methyl-1,2,4-oxadiazole*

16 g. of 3-phenyl-5-methyl-1,2,4-oxadiazole are added in small portions to 58 g. of chlorosulphonic acid cooled with iced water. The mixture is then warmed during two hours at 140°, is cooled, poured slowly in 500 g. of ground ice and filtered. The precipitate is washed with cold water and dried in a desiccator. The sulphonyl chloride thus obtained is pure enough to undergo the next phase. The analytical sample may be crystallized from ligroine.

24 g. of a compound having M.P. 69° are obtained.

*Analysis.*—For $C_9H_7ClN_2O_3S$. S Found: 12.44. Calc.: 12.39.

EXAMPLE 19

*3-p-sulphamoyl-phenyl-5-methyl-1,2,4-oxadiazole*

A suspension is made in 100 g. of anhydrous acetone of 65 g. of p-sulphamoyl-benzamidoxime and 2.2 g. of anhydrous potassium carbonate. With stirring and cooling 2.5 g. of acetyl chloride dissolved in 25 cc. of anhydrous acetone are added to the suspension. After stirring during 4 hours at room temperature the separated solid is filtered and put together with more product obtained by removing the solvent at reduced pressure. The product is washed with water and dried under vacuum. The O-acetyl-p-sulphamoyl-benzamidoxime crystallizes from alcohol and melts at 155–6° (with decomposition).

*Analysis.*—For $C_9H_{11}N_3O_4S$. S Found: 12.50. Calc.: 12.46.

From this compound, heating at 210° at 20 mm. until no more water is evolved, 3-p-sulphamoyl-phenyl-5-methyl-1,2,4-oxadiazole of M.P. 213–4° is obtained with good yield.

*Analysis.*—For $C_9H_9N_3O_3S$. S Found: 13.48. Calc.: 13.40.

EXAMPLE 20

*3-m-sulphamoylphenyl-5-propyl-1,2,4-oxadiazole*

8.6 g. of sulphamoylbenzamidoxime and 2.9 g. of anhydrous potassium carbonate in 150 cc. of anhydrous acetone are reacted with 4.5 g. of butiryl chloride, dissolved in 30 cc. of acetone. The O-butiryl-p-sulphamoyl-benzamidoxime is obtained with almost theoric yield; it crystallizes from alcohol and melts at 182° (by decomposing).

*Analysis.*—for $C_{11}H_{15}N_3O_4S$. S Found: 11.03. Calc.: 11.24.

The compound thus obtained is cyclized by heating at 180° at 20–30 mm. The solid 3-m-sulphamoylphenyl-5-propyl-1,2,4-oxadiazole is obtained readily by dissolving in diluted sodium hydroxide and acidifying. The compound crystallized from water melts at 98–99°. Yield 4.6 g.

*Analysis.*—For $C_{11}H_{13}N_3O_3S$: S Found: 11.96. Calc.: 11.99.

EXAMPLE 21

*Sodium 3-[3'-(1',2',4'-oxadiazoyl-5'-methyl)]benzene sulphonate*

3.2 g. of 3-phenyl-5-methyl-1,2,4-oxadiazole are added little by little to 10 cc. of sulphuric acid containing 20% of $SO_3$. The mixture is warmed to 140°, then cooled and added to 40 cc. of saturated NaCl solution cooled with iced water. Thus the sodium salt of the sulphuric acid is recovered, filtered, washed with a cold concentrated solution of NaCl and dried. 5.8 g. of substance are obtained, and may be crystallized from 95° alcohol.

The sodium salt crystallizes with two molecules of water.

*Analysis.*—For $C_9H_7N_2O_4SHa.2H_2O$. Found: N, 9.20; S, 10.60. Calc.: N 9.39; S 10.74.

To obtain the free sulphonic acid, the hot alcoholic solution of the sodium salt is acidified with hydrochloric acid. The inorganic salt is removed by filtering it off, and then the solvent is removed. The acid crystallizes from ethyl acetate and melts at 99–100°.

EXAMPLE 22

*3-p-carboxyphenyl-5-isobutyl-1,2,4-oxadiazole*

To a solution of 15.7 g. of p-carbethoxybenzamidoxime in 300 cc. of anhydrous acetone are added 6.2 g. of anhydrous potassium carbonate. With stirring and cooling a solution of 11 g. of isovaleryl chloride in 100 g. anhydrous acetone is slowly added to the mixture, which is kept under stirring for three more hours at room temperature. The solvent is removed at reduced pressure and the residue is accurately washed with water and dried in a desiccator.

18.5 g. of isovaleryl p-carbethoxybenzamidoxime which melts at 129–131° are obtained.

*Analysis.*—For $C_{15}H_{20}N_2O_4$. N Found: 9.79. Calc.: 9.58.

This compound is warmed during 30 minutes at 140° and 30 mm. of pressure and is successively distilled at reduced pressure.

14.4 g. of 3 p-carbethoxy-phenyl-5-isobutyl-1,2,4-oxadiazole, boiling at 138° at 0.1 mm. are obtained.

*Analysis.*—For $C_{15}H_{18}N_2O_3$. N Found: 10.49. Calc.: 10.21.

5.5 g. of this compound are dissolved in 10 cc. of absolute alcohol and added to a solution of 1.2 g. of NaOH in 30 cc. of absolute alcohol. The mixture is refluxed during one and a half hours, the solvent is removed and the residue is taken up with water.

By acidifying with dilute HCl a colourless substance separates, is filtered, washed and crystallizes from alcohol. 4.5 g. of 3-p-carboxyphenyl-5-isobutyl-1,2,4-oxadiazole are obtained. M.P. 179–80° C.

*Analysis.*—For $C_{13}H_{14}N_2O_3$. N Found: 11.75. Calc.: 11.38.

According to procedures similar to those described in the preceding examples the following compounds have also been prepared:

3-p-nitrophenyl-5-ethyl-1,2,4-oxadiazole. M.P. 106–7° for $C_{10}H_9N_3O_3$—Found: C, 54.60; H, 4.06. Calc.: C, 54.79; H, 4.14.

3-m-nitrophenyl-5-butyl-1,2,4-oxadiazole. B.P. 145° for $C_{12}H_{13}N_3O_3$. N Found: 17.27. Calc.: N 17.00.

3-p-nitrophenyl-5-isobutyl-1,2,4-oxadiazole. B.P. 0.2–144° for $C_{12}H_{13}N_3O_3$. N Found: 16.76. Calc.: 17.00.

3-p-aminophenyl-5-methyl-1,2,4-oxadiazole. M.P. 117° HCl M.P. 230° for $C_9H_{10}ClN_3O$. Cl Found: 16.63. Calc.: Cl 16.75.

3-m-aminophenyl-5-methyl-1,2,4-oxadiazole M.P. 79° HCl M.P. 235° for $C_9H_{10}ClN_3O$. Cl Found: 16.89. Calc.: Cl 16.75.

3-p-aminophenyl-5-ethyl-1,2,4-oxadiazole M.P. 96° HCl M.P. 199° for $C_{10}H_{11}N_3O$—Found: C, 63.53; H, 5.88. Calc.: C 63.47; H 5.86.

3-m-aminophenyl-5-butyl-1,2,4-oxadiazole B.P. 0.03–145° HCl M.P. 149° for $C_{12}H_{16}ClN_3O$. Cl Found: 13.73. Calc.: Cl 13.97.

3-m-aminophenyl-5-isobutyl-1,2,4-oxadiazole B.P. 0.02–133° HCl M.P. 170° for $C_{12}H_1 ClN_3O$. Cl Found: 13.79. Calc.: Cl 13.97.

3 - p - ethylaminophenyl-5-ethyl-1,2,4-oxadiazole HCl M.P. 151° C. for $C_{12}M_{16}ClN_3O$. Cl Found: 13.74. Calc.: Cl 13.97.

3-m-hydroxyphenyl-5-ethyl-1,2,4-oxadiazole M.P. 97–9° for $C_{10}H_{10}N_2O_2$. Found: C, 63.14; H, 5.20. Calc.: C 63.15; H 5.30.

3-p-hydroxyphenyl-5-propyl-1,2,4-oxadiazole M.P. 136–38° for $C_{11}H_{12}N_2O_2$. Found: C, 64.47; H, 5.90. Calc.: C 64.69; H 5.92.

3-p-hydroxyphenyl-5-butyl-1,2,4-oxadiazole M.P. 78° for $C_{12}H_{14}N_2O_2$. Found: C, 65.89; H, 6.15. Calc.: C 66.03; H 6.47.

3 - m - hydroxyphenyl - 5 - butyl - 1,2,4 - oxadiazole B.P.$_{0.02}$ 143° for $C_{12}H_{14}N_2O_2$—Found: C, 66.23; H, 6.47. Calc.: C, 66.03; H, 6.47.

3 - p - hydroxyphenyl - 5 - isobutyl - 1,2,4 - oxadiazole B.P.$_{0.02}$ 144° for $C_{12}H_{14}N_2O_2$—Found: C, 66.23; H, 6.37. Calc.: C, 66.03; H, 6.47.

3 - m - hydroxyphenyl - 5 - isobutyl - 1,2,4 - oxadiazole B.P.$_{0.01}$ 132° for $C_{12}H_{14}N_2O_2$—Found: C, 65.80; H, 6.61. Calc.: C, 66.03; H, 6.47.

3 - p - sulphamoylphenyl - 5 - propyl - 1,2,4 - oxadiazole M.P. 121–23° for $C_{11}H_{13}N_3O_3S$—S Found: 12.26. Calc.: 12.00.

3 - p - sulphamoylphenyl - 5 - isobutyl - 1,2,4 - oxadiazole M.P. 109–11° for $C_{12}H_{15}N_3O_3S$—S Found: 11.73. Calc.: 11.40.

3 - m - sulphamoylphenyl - 5 - isobutyl - 1,2,4 - oxadiazole M.P. 87–8° for $C_{12}H_{15}N_3O_3S$—S Found: 11.61. Calc.: 11.40.

3 - m - methylsulphonamidophenyl - 5 - methyl - 1,2,4-oxadiazole M.P. 107–9° for $C_{10}H_{11}N_3O_3S$—S Found: 12.51. Calc.: 12.66.

3 - m - methylsulphonamidophenyl - 5 - propyl - 1,2,4-oxadiazole M.P. 61–2° C. for $C_{12}H_{15}N_3O_3S$—S Found: 11.29; Calc. 11.40.

3 - m - methylsulphonamidophenyl - 5 - isobutyl - 1,2,4-oxadiazole B.P.$_{0.01}$ 188° for $C_{13}H_{17}N_3O_3S$—S Found: 10.64. Calc.: 10.85.

3 - m - ethylsulphonamidophenyl - 5 - methyl - 1,2,4-oxadiazole M.P. 101–3° for $C_{11}H_{13}N_3O_3S$—N Found: 15.95. Calc.: 15.73.

3 - m - diethylsulphonamidophenyl - 5 - ethyl - 1,2,4-oxadiazole M.P. 113–15° for $C_{13}H_{17}N_3O_3S$—N Found: 14.06. Calc.: 14.23.

3 - p - diethylsulphonamidophenyl - 5 - ethyl - 1,2,4-oxadiazole M.P. 91–92° for $C_{14}H_{19}N_3O_3S$—Found: C, 93.96; H, 5.75. Calc.: C, 54.36; H, 6.19.

3 - p - carboxyphenyl - 5 - propyl - 1,2,4 - oxadiazole M.P. 180° for $C_{12}H_{12}N_2O_3$—N Found: 11.82. Calc.: 12.06.

3 - p - ureidophenyl - 5 - methyl - 1,2,4 - oxadiazole M.P. 292° for $C_{10}H_{10}N_4O_2$—N Found: 25.94. Calc.: 25.68.

3 - m - ureidophenyl - 5 - ethyl - 1,2,4 - oxadiazole M.P. 190° for $C_{11}H_{12}N_4O_2$—N Found: 24.46. Calc.: 24.13.

3 - p - N - methylguanidophenyl - 5 - methyl - 1,2,4-oxadiazole M.P. HCl 178° for $C_{11}H_{14}ClN_5O$—Cl Found: 13.28. Calc.: 13.24.

I claim:

1. A compound having the formula:

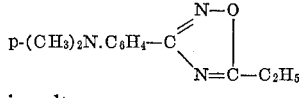

or its non-toxic salts.

2. A compound having the formula:

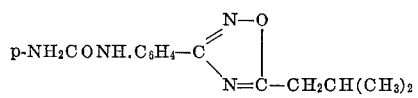

3. A compound having the formula:

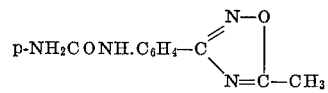

4. A compound having the formula:

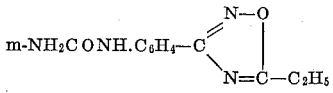

5. A compound having the formula:

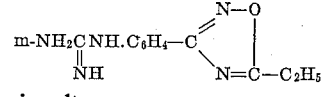

or its non-toxic salts.

6. A compound having the formula:

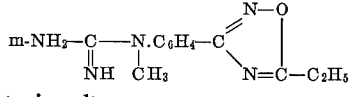

or its non-toxic salts.

7. A compound having the formula:

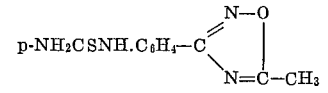

8. A compound having the formula:

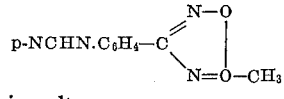

or its non-toxic salts.

9. A compound having the formula:

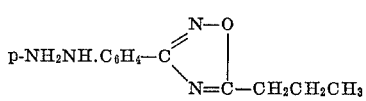

or its non-toxic salts.

10. A compound having the formula:

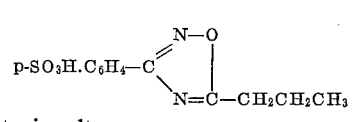

or its non-toxic salts.

11. A compound having the formula:

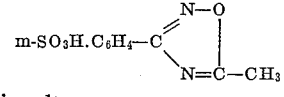

or its non-toxic salts.

12. A compound having the formula:

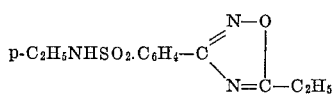

or its non-toxic salts.

13. A compound having the formula:

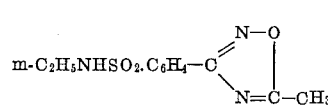

or its non-toxic salts.

14. A compound having the formula:

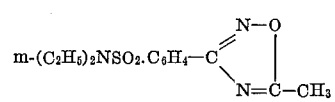

15. A compound having the formula:

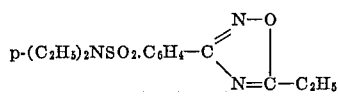

References Cited by the Examiner
UNITED STATES PATENTS
3,074,957 1/1963 Schaefer et al. _____ 260—307

FOREIGN PATENTS
212,830 1/1961 Austria.

OTHER REFERENCES
Bergmann et al.: J. Org. Chem. vol 18, page 64, (1953).

Crem et al.: Organic Chemistry, New York, McGraw-Hill, 1959, pp. 355, 365, 367, and 368.

Wiley: ed., Five- and Six-Membered Compounds with Nitrogen and Oxygen, New York, Interscience Publishers, 1962, pp. 246 and 247.

ALEX MAZEL, *Primary Examiner.*

HENRY R. JILES, *Examiner.*

RICHARD J. GALLAGHER, *Assistant Examiner.*